United States Patent
Gellert et al.

(10) Patent No.: US 6,230,384 B1
(45) Date of Patent: May 15, 2001

(54) METHOD OF MAKING AN INJECTION MOLDING CYLINDRICAL MANIFOLD INSERT

(75) Inventors: Jobst Ulrich Gellert, Georgetown; Helen Zhuang, Mississauga, both of (CA)

(73) Assignee: Mold-Masters Limited, Georgetown (CA)

( * ) Notice: Subject to any disclaimer, the term of this patent is extended or adjusted under 35 U.S.C. 154(b) by 0 days.

(21) Appl. No.: 09/455,386

(22) Filed: Dec. 6, 1999

Related U.S. Application Data

(62) Division of application No. 09/058,919, filed on Apr. 13, 1998, now Pat. No. 6,095,790.

(30) Foreign Application Priority Data

Mar. 27, 1998 (CA) .................................................. 2233433

(51) Int. Cl.⁷ ................................ B23P 11/02; B23Q 3/00
(52) U.S. Cl. ................................................. 29/447; 29/464
(58) Field of Search ..................... 29/447, 464; 425/549, 425/568, 570, 572

(56) References Cited

U.S. PATENT DOCUMENTS

| | | | | |
|---|---|---|---|---|
| 3,724,095 | * | 4/1973 | Laue et al. | 34/139 |
| 5,150,636 | * | 9/1992 | Hill | 76/108.2 |
| 5,267,384 | * | 12/1993 | Teeslink | 29/447 |
| 5,366,369 | * | 11/1994 | Gellert | 425/549 |

\* cited by examiner

Primary Examiner—I. Cuda Rosenbaum
Assistant Examiner—Marc Jimenez
(74) Attorney, Agent, or Firm—Foley & Lardner

(57) ABSTRACT

Injection molding apparatus and method wherein a number of cylindrical inserts or plugs each having a curved melt duct therethrough are accurately aligned and securely mounted in spaced cylindrical openings through a melt distribution manifold. An alignment and retaining pin made of a very strong material extends from a bore in the manifold into a bore in the insert. The manifold is heated and the inserts and pins are cooled prior to insertion into place to provide very tight fits when they are at the same temperature which very accurately aligns the melt ducts through the inserts. The combination of the inserts fitting tightly in the openings and the strength of the pins is sufficient to withstand the rearward forces from the pressurized melt being injected through the curved melt ducts to retain the inserts in place.

3 Claims, 3 Drawing Sheets

METHOD OF MAKING AN INJECTION MOLDING CYLINDRICAL MANIFOLD INSERT

This is a divisional of application Ser. No. 09/058,919 filed Apr. 13, 1998 U.S. Pat. No. 6,095,790.

BACKGROUND OF THE INVENTION

This invention relates generally to injection molding apparatus and a method of making it and more particularly to such apparatus and method wherein a number of cylindrical inserts each having a curved melt duct extending therethrough are each securely seated in a predetermined position in one of a plurality of spaced transverse openings extending through a melt distribution manifold.

Injection molding apparatus having a heated melt distribution manifold and a plurality of spaced heated nozzles each conveying melt to a different gate are well known. The melt distribution manifold has a melt passage with a number of branches extending outwardly from a common inlet portion to convey the melt to the spaced heated nozzles. Each nozzle has a central melt bore extending at 90° to the branches of the melt passage in the melt distribution manifold. It is also known to seat inserts or plugs in transverse openings extending through the melt distribution manifold in alignment with the nozzles. Each insert has a melt duct with a smoothly curved bend extending through 90° from an inlet in alignment with a respective branch of the melt passage in the melt distribution manifold to an outlet in alignment with the melt bore through an aligned nozzle.

In order to avoid colour change problems and stress in the melt it is critical that the melt duct through each insert be very accurately aligned with the respective branch of the melt passage and the central melt bore through the respective nozzle. It is also important that the insert be secured in place to withstand rearward forces from the pressurized melt flowing through the bend in the melt duct. Mold-Masters Limited, Canadian Patent Application Serial Number 2,047,461 laid open Jan. 20, 1993 entitled "Injection Molding Manifold with Removable Inserts" shows inserts which are aligned by alignment pins and are tapered to withstand the force of the melt flowing through the curved melt ducts. U.S. Pat. No. 5,366,369 to Gellert which issued Nov. 22, 1994 shows inserts having outer flange portions to securely retain them in place against these same forces. However, these previous inserts have the disadvantages that they are relatively costly to make and slight misalignment remains a problem, particularly when molding some modern materials which are very shear sensitive.

SUMMARY OF THE INVENTION

Accordingly, it is an object of the present invention to at least partially overcome the disadvantages of the prior art by providing injection molding apparatus which is easier to make and an improved method of accurately mounting the inserts and securely retaining them in place.

To this end, in one of its aspects, the invention provides an injection molding apparatus having a heated melt distribution manifold and a plurality of spaced heated nozzles seated in a mold. Each of the heated nozzles have a melt bore extending therethrough to convey melt to a gate leading to a cavity. The melt distribution manifold has a melt passage and a plurality of spaced transverse openings extending therethrough with each transverse opening aligned with one of the nozzles. The melt passage has a plurality of branches extending outwardly from a common inlet portion towards each of the nozzles. A plurality of inserts or plugs each have a rear face, a front face, an outer surface, and a melt duct extending therethrough. Each insert is received in one of the transverse openings in the melt distribution manifold with its face abutting against the rear end of a respective nozzle. The melt duct has a smoothly curved bend extending through substantially 90° from an inlet on the outer surface in matching alignment with one of the branches of the melt passage in the melt distribution manifold to an outlet on the front face in matching alignment with the melt bore through the respective nozzle. Each transverse opening in the melt distribution manifold is cylindrical. The outer surface of each insert is cylindrical and fits tightly in said one of the transverse openings in the melt distribution manifold. Each insert has an alignment and retaining pin or plug fitting tightly in a retaining pin bore in the melt distribution manifold and an aligned alignment and retaining pin bore in the insert.

In another of its aspects, the invention further provides a method of making injection molding apparatus having a melt distribution manifold with a plurality of spaced transverse openings therethrough and a melt passage having a plurality of branches extending outwardly from a common inlet portion to the plurality of spaced transverse openings. A number of inserts each have an outer surface and a melt duct with a smoothly curved bend extending therethrough from an inlet on the outer surface. Each insert is seated in one of the transverse openings in the melt distribution manifold with the inlet to the melt duct in alignment with one of the branches of the melt passage in the melt distribution manifold. The melt distribution manifold is made with the transverse openings and the melt passage, and the inserts are made with the melt ducts. Each insert is inserted into one of the transverse openings with the inlet to the melt duct in each insert in alignment with one of the branches of the melt passage in the melt distribution manifold. The spaced transverse openings through the melt distribution manifold are made cylindrical. The inserts with their outer surfaces cylindrical to fit tightly in the transverse openings through the melt distribution manifold when the inserts and the melt distribution manifold are at the same temperature. An alignment and retaining pin bore is machined extending through the melt distribution manifold to each transverse opening. A matching alignment and retaining pin bore is machined in each insert extending radially inward from the outer surface of the insert opposite from and in alignment with the inlet to the melt duct. Alignment and retaining pins are made to fit tightly in the alignment and retaining pin bores in the melt distribution manifold and each insert when the inserts and the melt distribution manifold are at the same temperature. The melt distribution manifold is heated to a predetermined temperature. The inserts and alignment and retaining pins are cooled to a predetermined temperature. Each cooled insert is then inserted into one of the transverse openings in the heated melt distribution manifold with the alignment and retaining pin bore in the cooled insert aligned with the alignment and retaining pin bore in the heated melt distribution manifold. One of the cooled alignment and retaining pins is then inserted to extend through the alignment and retaining pin bore in the heated melt distribution manifold into the aligned alignment and retaining pin bore in each cooled insert. Thus, when the inserts and the melt distribution manifold are at the same temperature, the tight fits of the inserts in the transverse openings and the alignment and retaining pins in the alignment and retaining bores in the inserts and the melt distribution manifold both accurately align and securely retain the inserts in place.

Further objects and advantages of the invention will appear from the following description taken together with the accompanying drawings.

DETAILED DESCRIPTION OF THE INVENTION

Figure 1:
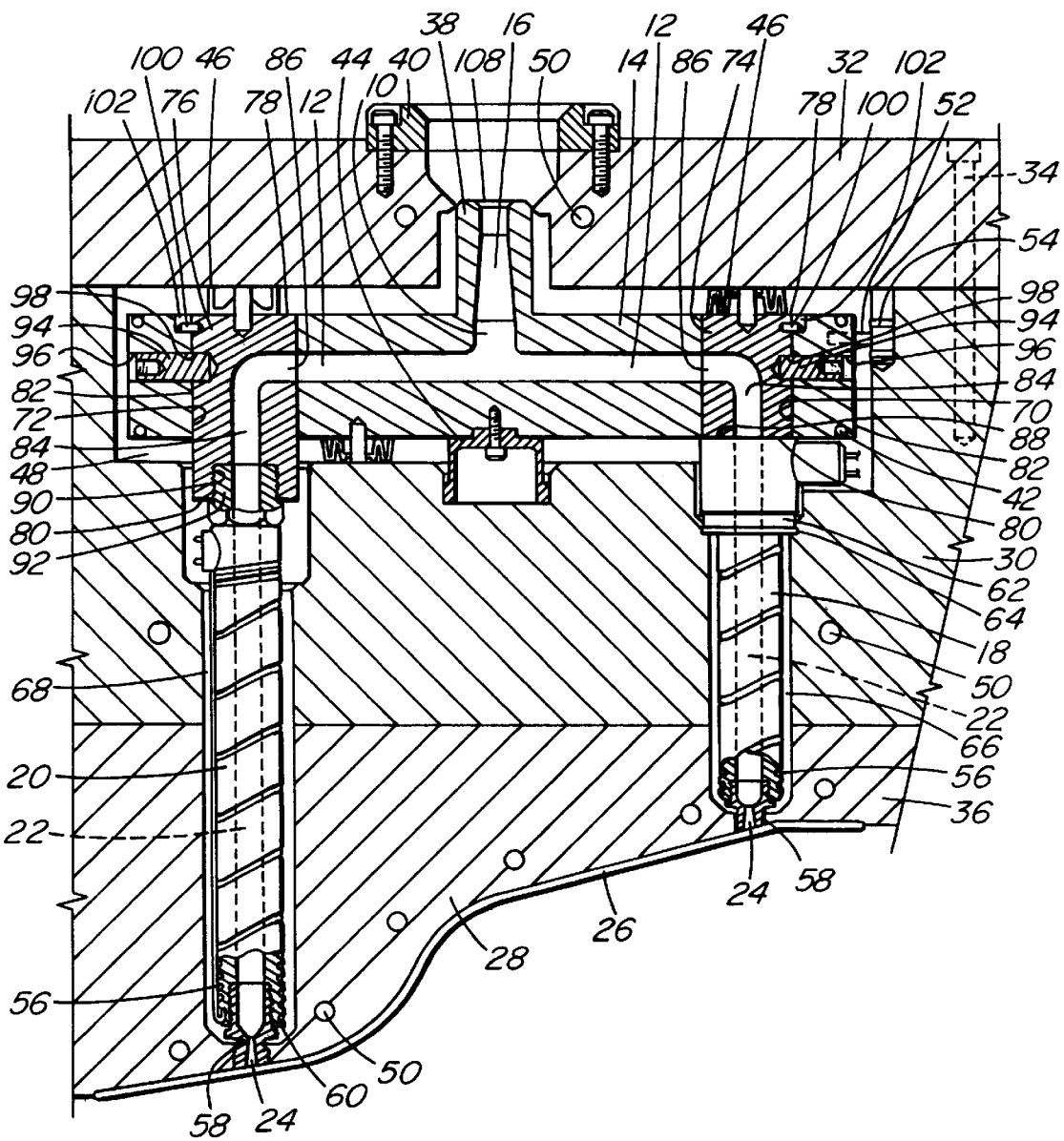
FIG. 1 is a sectional view of a portion of an injection molding system showing a melt distribution manifold with two inserts according to one embodiment of the invention.

Reference is first made to FIG. 1 which shows a portion of an injection molding system or apparatus with a melt passage 10 having branches 12 which extend outwardly in a steel melt distribution manifold 14 from a central inlet portion 16 to a shorter nozzle 18 and a longer nozzle 20. The melt passage 10 extends through a central melt bore 22 in each nozzle 18, 20 to gates 24 leading to a cavity 26. While only a single cavity 26 is shown, in other embodiments each gate 24 can lead to a separate cavity. While the melt distribution manifold 14 and only the two steel nozzles 18, 20 are shown mounted in a mold 28 for ease of illustration, an injection molding system will normally have many more nozzles 18, 20 with melt passage branches 12 extending to them. Similarly, while the mold 28 can have a greater number of plates depending upon the application, in this case, only a nozzle retainer plate 30 and a back plate 32 secured together by bolts 34, as well as a cavity retainer plate 36 are shown for ease of illustration.

The melt distribution manifold 14 has a central inlet portion 38 surrounded by a locating ring 40 and is heated by an integral electrical heating element 42. The melt distribution manifold 14 is mounted between the nozzle retainer plate 30 and the back plate 32 by a central manifold locator 44 and a number of pressure discs 46 which provide an insulative air space 48 between the heated manifold 14 and the surrounding mold 28, which is cooled by pumping a cooling fluid such as water through cooling conduits 50. The melt distribution manifold 14 is accurately aligned in place by a locating pin 52 extending outwardly into a cam 54 seated in the nozzle retainer plate 30.

Each of the heated nozzles 18, 20 has an integral electrical heating element 56 extending around the central melt bore 22. In this embodiment, each of the heated nozzles 18, 20 also has a gate insert 58 mounted at its front end 60 with the gate 24 extending therethrough to the cavity 26. The shorter heated nozzle 18 also has a flange portion 62 which fits in a circular seat 64 in the nozzle retainer plate 30. This locates the short heated nozzle 18 with an insulative air space 66 extending between it and the surrounding cooled mold 28. As described below, the longer heated nozzle 20 is also mounted with an insulative air space 68 extending between it and the surrounding cooled mold 28.

Figure 2:
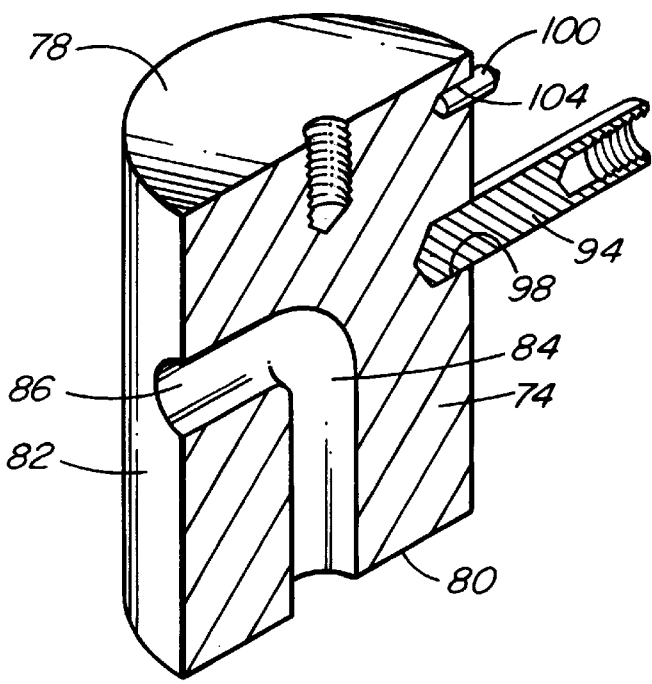
FIG. 2 is an isometric view of the insert seen on the right in FIG. 1.
Figure 3:
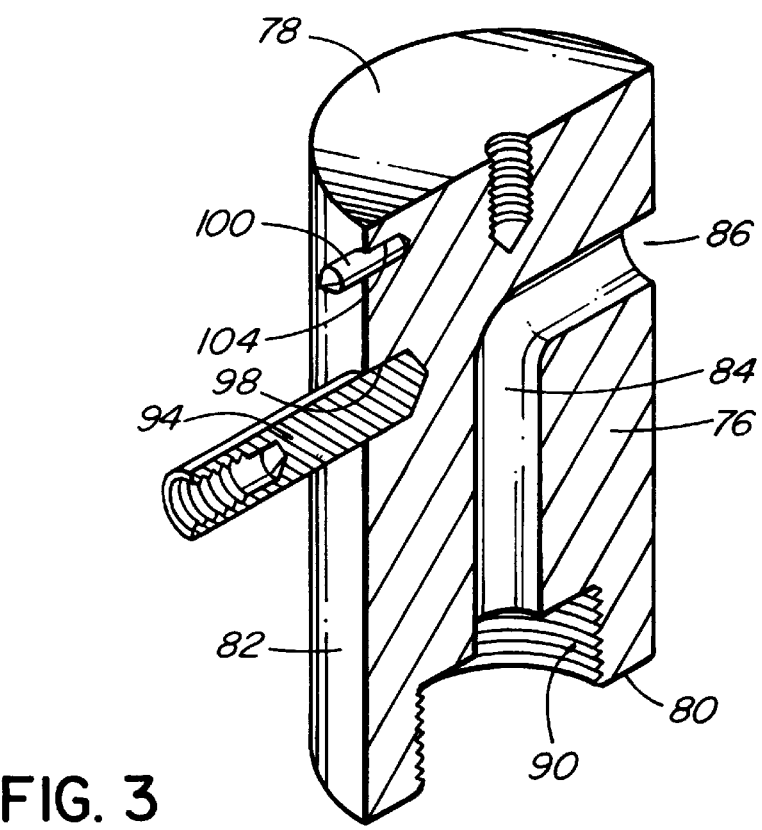
FIG. 3 is an isometric view of the insert seen on the left in FIG. 1, and FIGS. 4–6 are sectional views showing different steps in a method of mounting the inserts in a melt distribution manifold according to another embodiment of the invention.

Also referring to FIGS. 2 and 3, the melt distribution manifold 14 has a number of spaced cylindrical transverse openings 70, 72 extending therethrough with steel inserts or plugs 74, 76 received in them in alignment with the heated nozzles 18, 20. Each of the inserts 74, 76 has a rear face 78, a front face 80 and a cylindrical outer surface 82 which fits tightly in one of the cylindrical transverse openings 70, 72. Each of the inserts 74, 76 also has a melt duct 84 with a smoothly curved bend which extends through substantially 90° from an inlet 86 on the cylindrical outer surface 82. The melt duct 84 forms part of the melt passage 10 to convey melt from a respective branch 12 of the melt passage 10 to the melt bore 22 through the respective aligned nozzle 18, 20. In the embodiment shown, the insert 74 in the transverse opening 70 on the right in FIG. 1 with its front face 80 abutting against the rear end 88 of the shorter nozzle 18 is shorter than the insert 76 in the transverse opening 72 on the left. This difference in lengths of the inserts 74, 76 allows nozzles 18, 20 of standard lengths to be used to accommodate different distances between the melt distribution manifold 14 and the various gates 24. As can be seen, in this embodiment, the longer insert 76 has a threaded opening 90 extending from its front face 80 into which a threaded rear portion 92 of the longer nozzle 20 is screwed. This ensures the melt bore 22 in the longer nozzle 20 is aligned with the curved melt duct 84 through the insert 76 and, together with the gate insert 58 at its front end 60, locates the longer nozzle 20 with the insulative air space 68 extending around it.

Each of the inserts 74, 76 has an alignment and retaining pin or plug 94 which fits tightly in an alignment and retaining pin bore 96 in the melt distribution manifold 14 and an alignment and retaining pin bore 98 extending radially inward from the cylindrical outer surface 82 of each of the inserts 74, 76. In this embodiment, each alignment and retaining pin bore 96 in the melt distribution manifold 14 is a continuation of one of the branches 12 of the melt passage 10. The alignment and retaining pin bore 98 in each of the inserts 74, 76 is opposite from and in alignment with the inlet 86 to its melt duct 84. The alignment and retaining pins 94 are made of a very strong material such as hardened tool steel. Thus, the combination of the inserts 74, 76 fitting tightly in the transverse openings 70, 72 and the strength of the alignment and retaining pins 94 is sufficient to withstand the rearward forces generated from the pressurized melt being injected through the curved melt ducts 84 and retain the inserts 74, 76 in place.

In this embodiment, each of the inserts 74, 76 also has a prealignment pin 100 which extends from an opening 102 in the melt distribution manifold 14 into a prealignment pin bore 104 in each of the inserts 74, 76. The prealignment pins 100 do not fit tightly, and the purpose of them is to approximately prealign the alignment and retaining bore 98 in each of the inserts 74, 76 with the alignment and retaining bore 96 in the melt distribution manifold 14 to facilitate insertion of the cold inserts 74, 76 and the alignment and retaining pins 94 in the hot melt distribution manifold 14.

Figure 4:
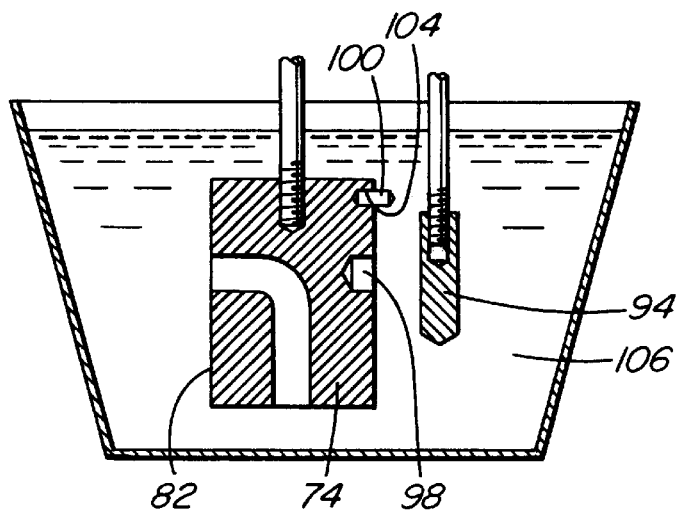
Figure 5:
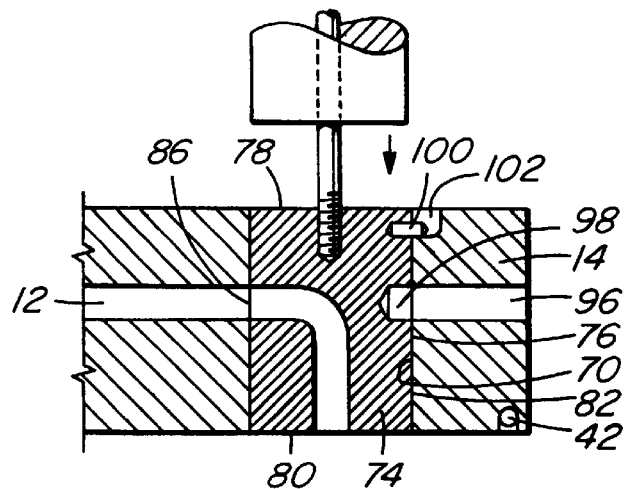
Figure 6:
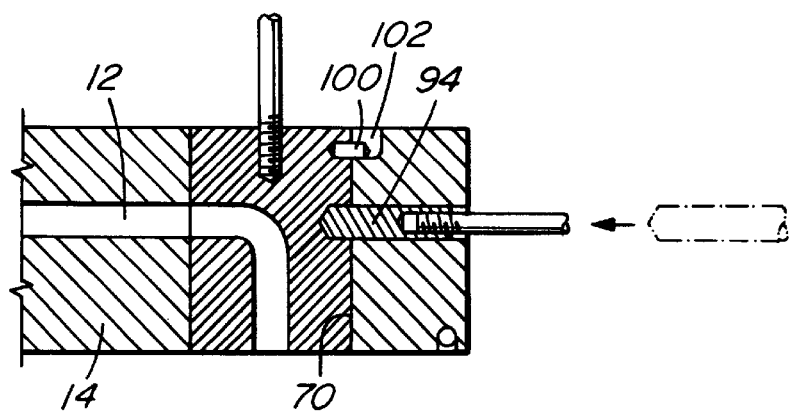

Reference is now also made to FIGS. 4–6 to describe the method of making the system of apparatus according to one embodiment of the invention. While only a portion of the melt distribution manifold 14 and the insert 74 on the right in FIG. 1 are shown for ease of illustration, it will be understood that the method is the same for both inserts 74, 76. A steel melt distribution manifold 14 is made having the integral electrical heating element 42 and a number of the spaced transverse cylindrical openings 70, 72 extending therethrough. A corresponding number of steel inserts 74, 76 having cylindrical outer surfaces 82 and predetermined lengths are made to fit tightly in the transverse openings 70, 72 in the melt distribution manifold 14 when the inserts 74, 76 and the melt distribution manifold 14 are at the same temperature. The inserts 74, 76 can be the same length or can have different lengths as shown in FIG. 1 to allow for different distances between the melt distribution manifold 14 and the different gates. The melt distribution manifold 14 is machined to provide the alignment and retaining pin bore 96 extending to each transverse opening 70, 72. As mentioned above, this bore 96 is usually a continuation of one of the branches 12 of the melt passage 10. Each of the inserts 74, 76 is machined to provide a matching alignment and retaining pin bore 98 extending radially inward from its outer surface 82 opposite from and in alignment with the inlet 86 to the melt duct 84.

Alignment and retaining pins 94 are made of a suitable strong material such as hardened tool steel to fit tightly in the alignment and retaining pin bores 96, 98 in the melt distribution manifold 14 and the inserts 74, 76 when the melt distribution manifold 14 and the inserts 74, 76 are at the same temperature. The melt distribution manifold 14 is heated in an oven to a suitable temperature of approximately 230° C. The inserts 74, 76 with the prealignment pins 100 inserted into the prealignment pin bores 104 and the alignment and retaining pins 94 are inserted into a bath 106 of a suitable material such as liquid nitrogen to cool them to a temperature of approximately −100° C. The cooled inserts 74, 76 are quickly inserted into the transverse openings 70, 72 in the heated melt distribution manifold 14 with the prealignment pins 100 received in the prealignment pin openings 102 in the melt distribution manifold 14. A cooled alignment and retaining pin 94 is also quickly inserted through the alignment and retaining pin bore 96 in the heated melt distribution manifold 14 into the alignment and retaining pin bore 98 in each of the cooled inserts 74, 76. When the melt distribution manifold 14 cools off and the inserts 74, 76 and alignment and retaining pins 94 warm up to the same temperature, the transverse openings 70, 72 contract and the inserts 74, 76 and the alignment and retaining pins 94 expand. This results in the alignment and retaining pins 94 fitting very tightly in the alignment and retaining pin bores 96 in the melt distribution manifold 14 and the inserts 74, 76 fitting very tightly in the transverse openings 70, 72 in the melt distribution manifold 14. The very tight fit of the alignment and retaining pins 94 in the alignment and retaining pin bores 96 provides very accurate alignment of the melt ducts 84 in the inserts 74, 76 with the branches 12 of the melt passage 10 and the melt bores 22 through the nozzles 18, 20. As mentioned above, the combination of the inserts 74, 76 fitting tightly in the transverse openings 70, 72 and the strength of the alignment and retaining pins 94 is sufficient to withstand the rearward forces from the pressurized melt being injected through the curved melt ducts 84 to retain the inserts 74, 76 in place.

In use, the system is assembled as shown in FIG. 1 with the inserts 74, 76 secured in the respective transverse openings 70, 72 in the melt distribution manifold 14. After assembly, electrical power is applied to the electrical heating elements 42, 56 in the melt distribution manifold 14 and the nozzles 18, 20 to heat the melt distribution manifold 14 and the nozzles 18, 20 to a predetermined operating temperature. Pressurized melt is then applied from a molding machine (not shown) to a central inlet 108 of the melt passage 10 according to a predetermined cycle. The melt flows through the inserts 74, 76, nozzles 18, 20 and gates 24 into the cavity 26. After the cavity 26 is filled and a suitable packing and cooling period has expired, injection pressure is released. The mold 28 is then opened to eject the molded product. After ejection, the mold 28 is closed and the cycle is repeated continuously every 15 to 30 seconds with a frequency depending upon the wall thickness and the number and size of the cavities 26 and the exact material being molded.

While the description of the hot runner injection molding apparatus and method with inserts 74, 76 accurately and securely mounted in spaced transverse openings through the melt distribution manifold 14 has been given with respect to preferred embodiments, it will be evident that various modifications are possible without departing from the scope of the invention as understood by those skilled in the art and as defined in the following claims.

The embodiments of the invention in which an exclusive property or privilege is claimed is defined as follows:

1. In a method of making injection molding apparatus having a melt distribution manifold with a plurality of spaced transverse openings therethrough and a melt passage having a plurality of branches extending outwardly from a common inlet portion to the plurality of spaced transverse openings, and a plurality of inserts each having an outer surface and a melt duct with a smoothly curved bend extending therethrough from an inlet on the outer surface, each insert being seated in one of the transverse openings in the melt distribution manifold with the inlet to the melt duct in alignment with one of the branches of the melt passage in the melt distribution manifold, the method including making the melt distribution manifold with the transverse openings and the melt passage, making the inserts with the melt ducts, and inserting each insert into one of the transverse openings with the inlet to the melt duct in each insert in alignment with one of the branches of the melt passage in the melt distribution manifold, having the improvement including;

(a) making the spaced transverse openings through the melt distribution manifold cylindrical, (b) making the inserts with the outer surface of each insert being cylindrical to fit tightly in said one of the transverse openings through the melt distribution manifold when the inserts and the melt distribution manifold are at the same temperature, (c) machining an alignment and retaining pin bore extending through the melt distribution manifold to each transverse opening, (d) machining a matching alignment and retaining pin bore in each insert extending radially inward from the outer surface of the insert opposite from and in alignment with the inlet to the melt duct, (e) making alignment and retaining pins to fit tightly in the alignment and retaining pin bores in the melt distribution manifold and each insert when the inserts and the melt distribution manifold are at the same temperature, (f) machining a prealignment pin opening in the melt distribution manifold, (g) machining a matching prealignment pin bore in each insert extending radially inward from the outer surface of the insert, (h) making prealignment pins to fit tightly in the prealignment pin openings in the melt distribution manifold and each insert when the inserts and the melt distribution manifold are at the same temperature, (i) mounting a prealignment pin to extend outwardly from the prealignment pin bore in each insert, (j) heating the melt distribution manifold to a predetermined temperature, (k) cooling the inserts, the prealignment pins and the alignment and retaining pins to a predetermined temperature, (l) inserting each cooled insert into one of the transverse openings through the heated melt distribution manifold with the prealignment pin extending into the prealignment pin opening in the melt distribution manifold to align the alignment and retaining pin bore in the cooled insert with the alignment and retaining pin bore in the heated melt distribution manifold, (m) inserting one of the cooled alignment and retaining pins to extend through the alignment and retaining pin bore in the heated melt distribution manifold into the aligned alignment and retaining pin bore in each cooled insert, whereby, when the inserts and the melt distribution manifold are at the same temperature, the tight fits of the inserts in the transverse openings and the alignment and retaining pins in the alignment and retaining bores in the inserts and the melt distribution manifold both accurately align and securely retain the inserts in place.

2. A method of securely assembling a manifold plug (74) into a mold manifold (14) comprising the steps of:

(a) providing a manifold (14) having a manifold melt channel (10), a through bore (70) for accommodating the manifold plug (74), a bore (96) to receive a retaining pin (94) and a opening (102) to locate a prealignment pin (100), (b) providing the manifold plug (74) having a plug melt channel (84), a prealignment pin bore (104) to accommodate the prealignment pin (100) and a retaining pin bore (98) to accommodate the retaining pin (94), (c) inserting the prealignment pin (100) in the prealignment pin bore (104), (d) inserting the manifold plug (74) inside the through bore (70) until the prealignment pin (100) fully reaches the bottom of the opening (102), and (e) inserting the retaining pin (94) through the retaining pin bores (96) and (98) to securely locate the manifold plug (74) in the manifold (14) so that the manifold melt channel (10) and the plug melt channel (84) are in alignment.

3. A method according to claim 2, where the temperature of the manifold plug (74) and of the retaining pin (94) is lower than the temperature of the mold manifold (14) during the assembling step.

* * * * *